United States Patent [19]

Egawa

[11] Patent Number: 4,608,568
[45] Date of Patent: Aug. 26, 1986

[54] SPEED DETECTING DEVICE EMPLOYING A DOPPLER RADAR

[75] Inventor: Akira Egawa, Hiratsuka, Japan

[73] Assignee: Kabushiki Kaisha Komatsu Seisakusho, Tokyo, Japan

[21] Appl. No.: 427,921

[22] Filed: Sep. 29, 1982

[30] Foreign Application Priority Data

Oct. 15, 1981 [JP] Japan .............................. 56-164433
Oct. 19, 1981 [JP] Japan .............................. 56-166869

[51] Int. Cl.$^4$ ...................... G01S 13/00; G01S 13/58; G01S 9/66
[52] U.S. Cl. .................................... 343/8; 343/7 A; 367/90
[58] Field of Search ............. 343/8, 9 R, 17.7, 7 VM, 343/7 A, 7 R; 364/565; 367/90, 91

[56] References Cited

U.S. PATENT DOCUMENTS

| 3,617,993 | 11/1971 | Massie ........................ 343/8 |
| 3,631,486 | 12/1971 | Anders et al. ............... 343/8 |
| 3,760,415 | 9/1973 | Holmstrom et al. ........... 343/7 VM |
| 3,789,950 | 2/1974 | Strenglein ................... 343/7 VM |
| 3,918,058 | 11/1975 | Noyori et al. ................ 343/8 X |
| 4,030,097 | 6/1977 | Gedeon ....................... 343/8 |
| 4,073,359 | 2/1978 | Fujiki et al. ................. 343/7 VM |
| 4,101,890 | 7/1978 | Goyard ....................... 343/8 |
| 4,104,632 | 8/1978 | Fujiki et al. ................. 343/7 VM |
| 4,131,889 | 12/1978 | Gray .......................... 343/8 |
| 4,180,816 | 12/1979 | Endo et al. .................. 343/7 VM |
| 4,208,658 | 6/1980 | Fujiki et al. ................. 343/7 VM |
| 4,309,763 | 1/1982 | Passmore et al. ............. 367/15 X |
| 4,316,173 | 2/1982 | Matsumural .................. 343/17.7 X |
| 4,349,823 | 9/1982 | Tagami et al. ................ 343/7 VM |
| 4,354,191 | 10/1982 | Matsumura et al. ........... 343/8 X |
| 4,366,546 | 12/1982 | Tachibana et al. ............ 343/7 VM |
| 4,414,548 | 11/1983 | Carpenter et al. ............ 343/7 VM |

Primary Examiner—Charles T. Jordan
Assistant Examiner—Brian S. Steinberger
Attorney, Agent, or Firm—Spensley Horn Jubas & Lubitz

[57] ABSTRACT

A speed detecting device comprises a comparing circuit for comparing the amplitude of a Doppler signal with a reference amplitude value, and an excluding circuit for excluding a speed signal corresponding to the Doppler signal of the amplitude smaller than the reference amplitude value, whereby the speed signal corresponding to the Doppler signal of the amplitude larger than a predetermined value.

One embodiment of the device further comprises a circuit for selecting and outputting a Doppler signal of the largest amplitude, thereby detecting a vehicle speed based on the Doppler signal of the largest amplitude.

Another embodiment of the device comprises a modulator for sequentially changing transmitting frequency of the Doppler radar into a plurality of frequencies at a predetermined period, a detector circuit for detecting each Doppler signal from the Doppler radar in synchronism with the change of the transmitting frequency, a signal processing circuit for forming a Doppler signal corresponding to the transmitting frequency, and a selecting circuit for selecting a Doppler signal of the largest amplitude.

12 Claims, 13 Drawing Figures

4,608,568

SPEED DETECTING DEVICE EMPLOYING A DOPPLER RADAR

BACKGROUND OF THE INVENTION

1. Field of the Invention

The present invention relates to the field of speed detecting devices employing a Doppler radar.

2. Description of the Prior Art

Generally, when a vehicular speed is detected using a Doppler radar, the amplitude of the Doppler signal changes due to fading of radar waves, resulting in errors in the speed detection.

Particularly, when the speed of low-speed vehicles, such as construction vehicles, is detected, the effects of vehicular speed errors are serious because frequency of Doppler signal is low, and repetition time of the fading is long.

In order to eliminate such effects of vehicular speed detection errors at the time of low vehicle speed, speed detection devices which detect fading and reduce vehicle speed detection errors based on the size of the fading have been typically proposed. Such devices work effectively when the fading depth is large, but they are unable to prevent speed detection errors from occurring satisfactorily when the fading depth is small, since fading cannot be detected in such case.

SUMMARY OF THE INVENTION

It is an object of the present invention to provide a Doppler radar signal processing device which can eliminate speed detector errors regardless of the fading depth.

To achieve the above object, based on the finding of correlation between the amplitude of Doppler signal and vehicle speed detection error, the occurrence of vehicle speed detection errors caused by the fading of radar waves is kept to the minimum by excluding vehicle speed signals detected during the period when the amplitude of Doppler signal is below a given value.

It is a further object of the present invention to provide a speed detecting device which can reduce speed detection errors caused by the fading without lowering the response property.

To attain the above object, according to the invention, a plurality of Doppler radars are used, the amplitudes of Doppler signals obtained by those Doppler radars are compared, and a speed signal is obtained based on the Doppler signal of the largest amplitude, or weighted mean of the speed signals based on the above individual Doppler signals are calculated with the amplitude signal taken as weight and the speed is obtained from that mean.

It is a still further object of the present invention to provide a high precision, good response speed detecting device using a single Doppler radar.

To realize the above objective, according to the present invention, a variable frequency oscillator is used as the oscillator of the Doppler radar, the output frequency of the above oscillator is changed by a modulator to a plurality of different frequencies sequentially at a given period, the Doppler signal resulting from the radar waves of each of the above frequencies is detected synchronized with the modulated output of said modulator, and a plurality of Doppler signals is designed to be obtained by a single Doppler radar through the reproduction of Doppler signals of said individual frequencies from the signals thus detected. By using the signal of the largest amplitude of all Doppler signals thus obtained, the speed detection accuracy is designed to be enhanced.

The novel features which are believed to be characteristics of the present invention, together with further objects thereof will be better understood from the following description considered in connection with the accompanying drawings in which presently preferred embodiments of the invention are illustrated by way of example.

DETAILED DESCRIPTION OF THE INVENTION

Figure 1:
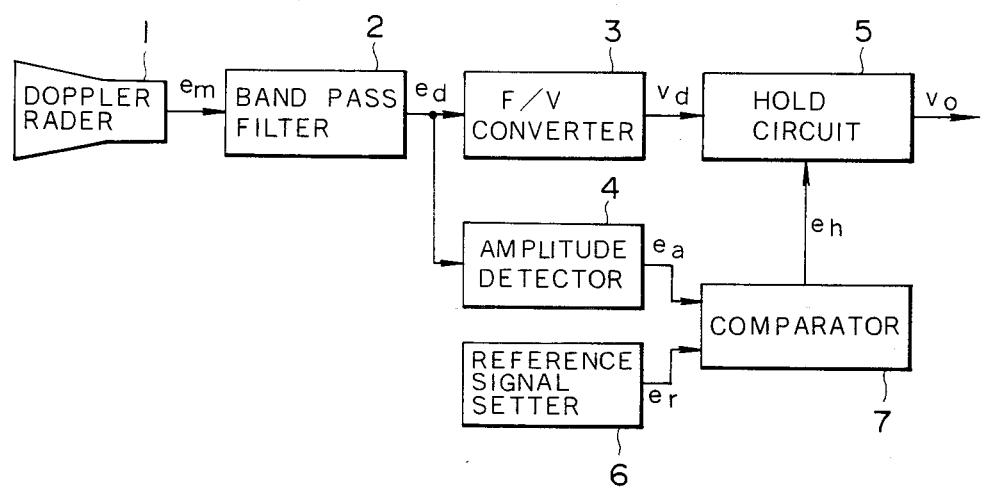
FIG. 1 is a block diagram of an embodiment of the speed detection device of the present invention.

Referring to FIG. 1, a block diagram of an embodiment of the Doppler radar signal processor of the present invention is illustrated.

In FIG. 1, a Doppler radar 1 radiates radar waves, such as microwaves, to a target (an object to be measured), reflected waves therefrom are received, and these reflected waves are mixed with a part of the radar waves. Microwave signal $e_m$ resulting from the mixing is fed to a frequency-voltage converter 3, and an amplitude detector (circuit) 4 as a Doppler signal $e_d$ through a band pass filter 2.

The frequency-voltage converter forms an analog speed signal $v_d$ which corresponds to the frequency component of the Doppler signal $e_d$, and said speed signal $v_d$ is fed to a hold circuit 5.

The analog signal $v_d$ generally contains speed error due to fading.

Now, the principles of the Doppler radar signal processor of the present invention will be described.

Figure 2:
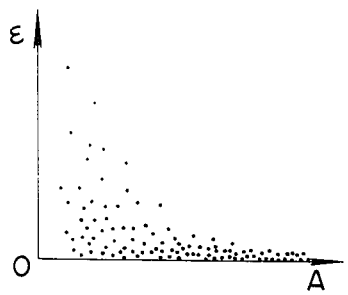
FIG. 2 is a distribution diagram showing the relationship between the amplitude of Doppler signal changing due to fading and speed detection error.

FIG. 2 is a distribution diagram showing the relationship between the amplitude A of Doppler signal $e_d$ and the error $\epsilon$ $$(= \frac{1 v_d - V_t}{V_t},$$

where $V_t$ = analog speed signal corresponding to the true speed). This distribution is determined by the directivity characteristic, etc. of the Doppler radar 1.

As evident from the diagram, there is correlation between the size of amplitude A and the size of error $\epsilon$, and the size of error $\epsilon$ and the width of scattering of error $\epsilon$ correspond. Accordingly, the variance $\sigma^2$ of error $\epsilon$ can be expressed as a function of the amplitude A, i.e., $\sigma^2 = f(A)$.

Figure 3:
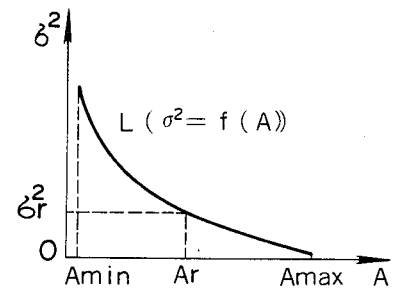
FIG. 3 is a graph showing the relationship between the amplitude of Doppler signal and the variance of speed detection error.

FIG. 3 is a graph showing the relationship between the variance of $\sigma^2$ and amplitude A, where the curve L represents the function f.

Meanwhile, it is known that the probability density function P(A) of Doppler signal amplitude A exhibits the Rayleigh distribution ($P(X) = K.x.e. \, KX^2/2 \, (X0)$, $P(X) = 0 \, (x \leq 0)$). Accordingly, if the largest possible value of the amplitude A is Amax, and the minimum value of Amin, the mean $\overline{\sigma^2}$ of this variance $\sigma^2$ may be given by the following Eq. (i).

$$\overline{\sigma^2} = \int_{Amin}^{Amax} f(A)P(A)dA \quad \text{(i)}$$

As mentioned already, the larger the variance $\sigma^2$, the larger the error $\sigma$ becomes. Accordingly, if the variance of $\sigma^2$ can be kept small, the error $\epsilon$ can be held small equivalently.

Referring to FIG. 3, if the amplitude Ar is selected so as to be Amin < Ar < Amax, the variance $\sigma r2$ corresponding to this amplitude Ar equals to f(Ar).

Now, when a function g(A), which can be represented as $g(A) = \sigma r2$ where A (amplitude) = Amin $\leq$ A $\leq$ Ar and g(A) = f(A) where A = Ar $\leq$ A $\leq$ Amax, is considered, this function g(A) is such that puts the variance $\sigma^2$ of the amplitude A within the range of Amin $\leq$ A $\leq$ Ar to be $\sigma^2 = \sigma^2 r2$. Accordingly, the mean $\overline{\sigma r2}$ of the variance when the variance $\sigma^2$ is expressed by g(A) becomes as given by the following Eq. (ii)

$$\sigma_r^2 = \sigma_r^2 \int_{Amin}^{Ar} P(A)dA + \int_{Ar}^{Amax} g(A)P(A)dA \quad \text{(ii)}$$

$$\sigma_r^2 = \sigma_r^2 \int_{Amin}^{Ar} P(A)dA + \int_{Ar}^{Amax} f(A)P(A)dA$$

where $$f(A) > r2 \, (A < Ar) \quad \text{(iii)}$$

$$f(A) < r2 \, (A > Ar) \quad \text{(iv)}$$

$$\int_{Amin}^{Amax} P(A)dA = 1 \quad \text{(v)}$$

Accordingly, from Eqs. (i) through (v)

$$\sigma_r^2 \leq \sigma_r^2 \int_{Amin}^{Ar} P(A)dA + \quad \text{(iv)}$$

$$\int_{Ar}^{Amin} f(A)P(A)dA < \sigma_r^2 < \int_{Amin}^{Amax} f(A)P(A)dA =$$

$$\overline{\sigma^2} \quad \overline{\sigma_r^2} < \sigma_r^2 < \overline{\sigma^2}$$

Thus, the mean $\overline{\sigma^2}$ of the variance when the variance $\sigma^2$ is expressed by the function g(A) is smaller than the mean $\overline{\sigma^2}$ of the variance when the variance $\sigma^2$ is given by the function f(A).

That is, by not using the detected speeds of the amplitude falling within the section of A $\leq$ Ar, the error $\epsilon$ of the detected speed can be reduced. The speed in the above section can be obtained by such processing as using the detected speed immediately before said section.

Accordingly, by excluding the analog speed signals $v_d$ when the amplitude A is Ar $\leq$ Ar, the speed error of the analog speed signal $v_d$ due to fading can be reduced.

In FIG. 1, a reference signal setter 6 is for setting the reference signal $e_r$ corresponding to the aforementioned amplitude Ar, and said reference signal $e_r$ is fed to the reference input of a comparator 7.

The amplitude detector 4 is for converting the amplitude component of the Doppler signal $e_d$ which is fed to the other input of the comparator 7.

The comparator 7 forms a hold signal $e_h$ whenever the amplitude signal $e_a$ becomes smaller than the reference signal $e_r$ and said hold signal $e_h$ is fed to the hold circuit 5.

The hold circuit 5 outputs the analog speed signal $v_d$ directly as a speed signal $v_o$ when no hold signal $e_h$ is fed. When the hold signal $e_h$ is fed, the hold circuit 5 maintains the analog speed signal $v_d$ applied to the leading edge of the hold signal $e_h$, outputting said signal $v_d$ as a speed signal $v_o$. Upon the fall of the hold signal $e_h$, the signal holding is released. The speed signal $v_o$ having been output from the hold circuit 5 is fed to the next stage control unit (not shown).

Figure 4:
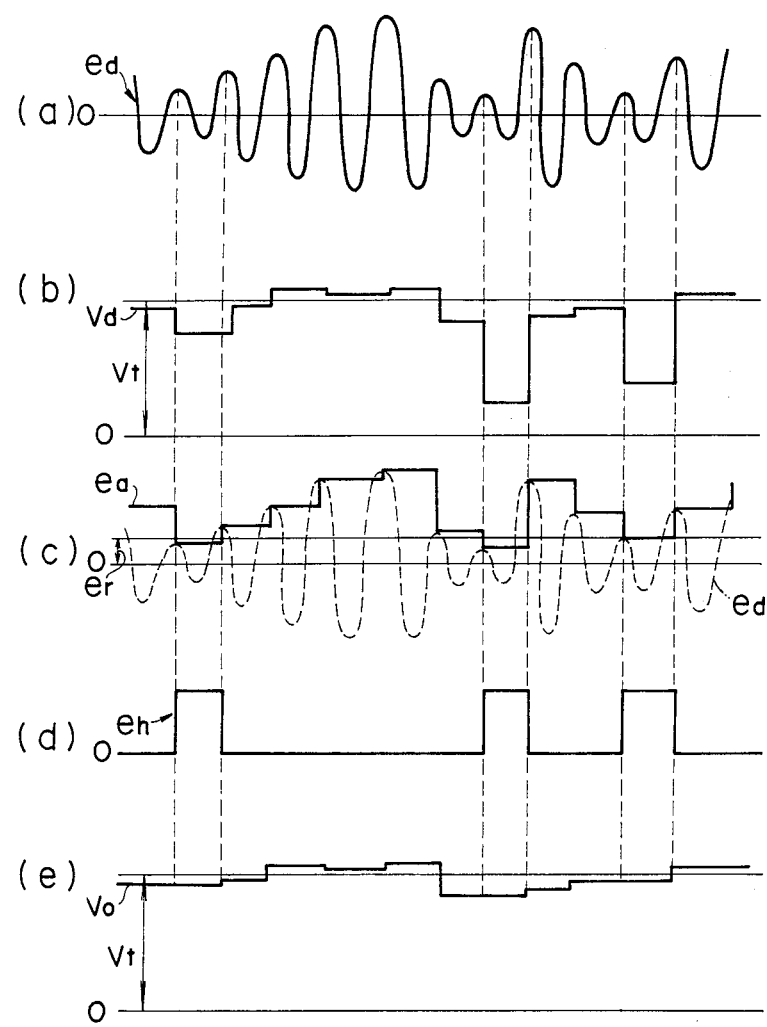
FIG. 4 is a timing chart showing the operation of the device shown in FIG. 1.

FIG. 4 is a timing chart illustrating the operation of each part of the processor shown in FIG. 1 by way of example.

For example, when a vehicle is running at a constant speed, and when the Doppler signal $e_d$ is one which has been effected by fading as shown in FIG. 4(a), the analog speed signal $v_d$ becomes as shown in FIG. 4(b). vt denotes the analog speed signal corresponding to the true speed of the vehicle.

On the other hand, the amplitude signal $e_a$ becomes as shown in FIG. 4(c). As a result of comparison of said signal $e_a$ and the reference signal $e_r$, a hold signal $e_h$ as shown in FIG. 4(d) is formed.

Accordingly, the hold circuit 5 outputs a speed signal $v_o$ as shown in FIG. 4(e).

The reference signal $e_r$ is determined taking into account the response characteristic of the vehicle speed signal $v_o$ to the actual vehicle speed.

Figure 5:
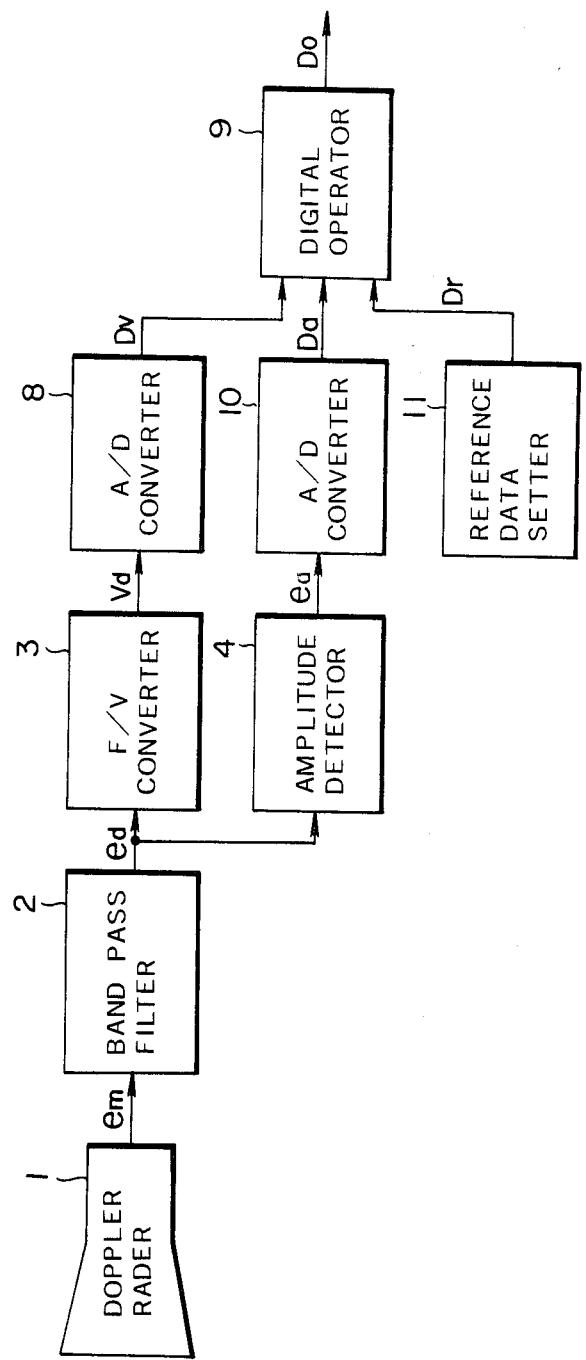
FIGS. 5 and 6 are block diagrams of other embodiments of the speed detection device of the present invention.

FIG. 5 shows another embodiment of the present invention. In this embodiment, digital signal processing is performed.

The analog speed signal $v_d$ is converted to a speed data Dv which is a corresponding digital signal by an analog-digital converter 8, the speed data Dv being fed to the digital operator 9.

The amplitude signal $e_a$ is converted to an amplitude data Da which is a corresponding digital signal by an analog-to-digital converter 10, the amplitude data Da being fed to the digital operator 9.

A reference data setter 11 sets the reference data Dr which is an amplitude data corresponding to the amplitude Ar, said reference data Dr being fed to the digital operator 9.

The digital operator 9 compares the reference data Dr with the amplitude data Da. When Da $\geq$ Dr, the digital operator inhibits the speed data Dv, and outputs other data, say, the speed data Dv immediately before inhibition, as output data Do. On the other hand, when Da<Dr, the digital operator 9 outputs the speed data Dv directly.

Since other parts are the same as those of the aforementioned embodiment, description thereof will be omitted assigning the same symbols.

Figure 6:
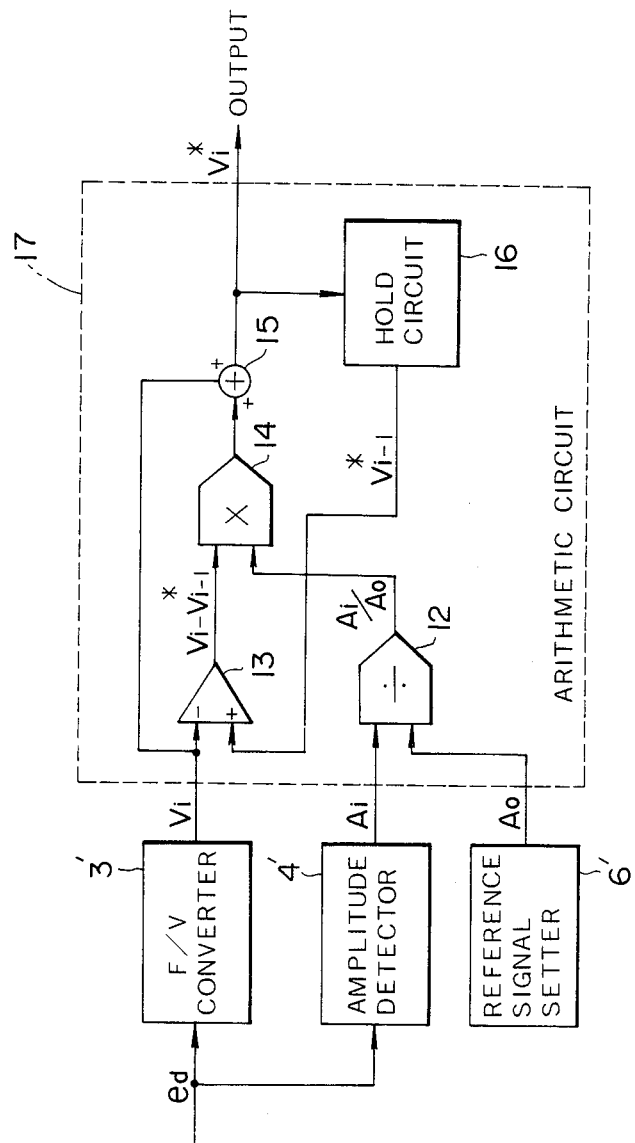

Though in the above-mentioned embodiment, when the amplitude of the Doppler signal falls below the specified level, the speed data immediately before that fall is output as the output data, the concept of the present invention is by no means limited to the above but allows alternatives. For example, it is possible to design so that an estimated value of speed data is calculated and said estimated value is output as the output data. That is, as shown in FIG. 6, by inputting the output signals Vi, Ai and Ao sent out from circuits 3' and 4' and a setter 5' respectively corresponding to the frequency-voltage converter 3, the amplitude detector 4 and reference signal setter 5 in the above embodiment into an arithmetic circuit 17 which comprises a divider 12, a subtractor 13, a multiplier 14, an adder 15 and a hold circuit 16 so as to cause the arithmetic circuit 17 to perform the following arithmetic operation, the speed signal Vi from the frequency-voltage converter 3 is changed into a modified speed signal Vi*.

$$Vi = V^*i - 1 + \frac{Ai}{Ao}(Vi - Vi - 1^*)$$

$$= \frac{A1}{Ao} Vi + \left(1 - \frac{Ai}{Ao}\right) Vi - 1^*$$

In the above equation, the function f(A) in FIG. 3 is approximated as follows.

$$f(A) \simeq \frac{k}{A^2}$$

An appropriate value obtained from the graph in FIG. 3 is employed as the reference amplitude value Ao set by the reference signal setter 5'. However, the average value of Ai is used as the signal Ao as follows.

$$Ao = \frac{1}{n} \sum_{j=i-n}^{i-1} Aj$$

The embodiments shown in FIGS. 1 and 5, however, have a disadvantage that when the reference signal amplitude is made larger so as to reduce the speed error contained in the speed signal vo, the time during which the true speed signal is output is shortened, and the response characteristic becomes worse eventually.

In addition, when the ground speed of a vehicle carrying the Doppler radar has changed, the speed detection corresponding to the speed change may not be made.

Figure 7:
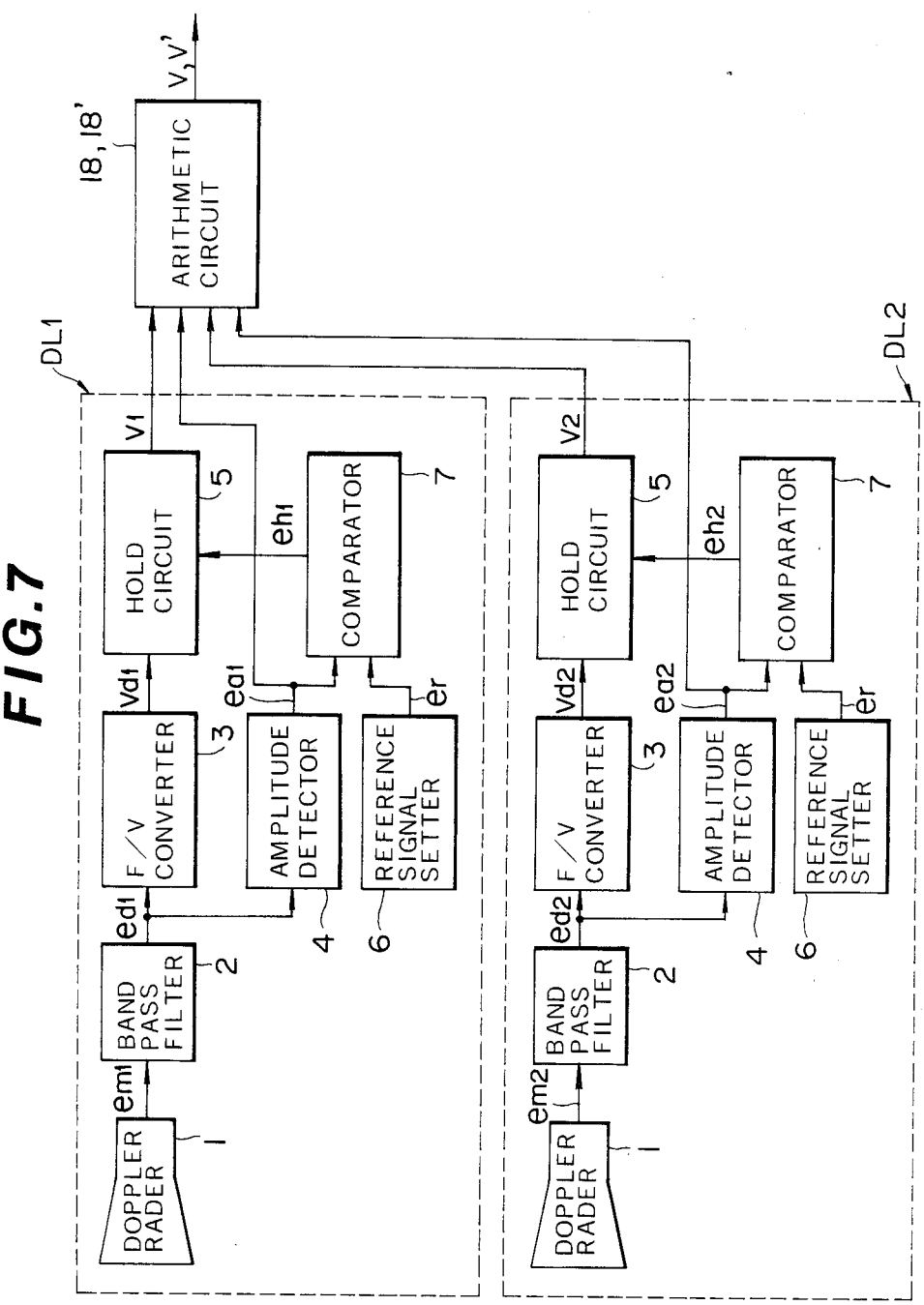
FIG. 7 is a block diagram of still another embodiment of the speed detection device of the present invention.

FIG. 7 shows an embodiment of the speed detecting device of the present invention. This embodiment has two devices shown in FIG. 1, and both Doppler radars 1 shown in FIG. 7 have identical characteristics, and radar waves thereof are radiated to the ground at the same angle.

Output signals $v_1$ and $v_2$ of the hold circuits 5 of detecting devices (Doppler radars) DL1 and DL2, and output amplitude signals $e_{a1}$ and $e_{a2}$ of amplitude detectors 4 are fed to an arithmetic circuit 18, or an arithmetic circuit 18' performing a function different from the arithmetic circuit 18.

The arithmetic circuit 18 compares the amplitude signal $e_{a1}$ and $e_{a2}$, outputs the speed signal $v_1$ as a speed signal v when $e_{a1}>e_{a2}$, and outputs the speed signal $v_2$ as a speed signal v when $e_{a2}>e_{a1}$.

The arithmetic circuit 18' calculates (refer to Eq. (xiii)) the weighted mean of the speed signals based on the amplitude signals $e_{a1}$ and $e_{a2}$, and speed signals $v_1$ and $v_2$ and outputs the operation result thereof as a speed signal.

The speed signals v and v' obtained by the arithmetic circuits 18 and 18' are output to the next stage travel control unit, etc. (not shown).

When the arithmetic circuit 18 is used, the mean $\overline{\sigma_0^2}$ of the variance of error $\epsilon$ contained in the speed signal v which is output from the arithmetic circuit 18 can be expressed by the following Eq. (vii).

$$\overline{\sigma_0^2} = \sigma_r^2 \left( \int^{Ar} P(A)dA \right)^2 + \qquad \text{(vii)}$$

$$2 \int_{Ar}^{A1} f(A) \cdot P(A) \left( \int_{Ar}^{A} P(t)dt \right) dA$$

In the above Eq. (vii), the probability $$\left\{ \int_{A2}^{Ar} P(A)dA \right\}^2$$

of the first term indicates the probability wherein both amplitude signals $e_{a1}$ and $e_{a2}$ are smaller than the reference signal $e_r$, and the probability $$2 \int_{Ar}^{A1} P(A) \left( \int_{Ar}^{A} P(t)dt \right) dA$$

of the second term indicates the probability wherein either of the signals $e_{a1}$ amd $e_{a2}$ is larger than the other.

The function f(A) and the probability density function P(A) are the functions described relative to the aforementioned embodiment, and Ar is the size of the amplitude corresponding to the reference signal $e_r$.

As already described relative to FIGS. 2 and 3, the mean $\overline{\sigma_r^2}$ of the variance of error $\epsilon$ can be given by Eq. (ii).

Here, to compare the embodiment of FIG. 1 and this embodiment, the difference between the means $\overline{\sigma_0^2}$ and $\overline{\sigma_r^2}$ of variances is obtained as follows.

$$\overline{\sigma_r^2} - \overline{\sigma_0^2} = \sigma_r^2 \int_{A2}^{Ar} P(A)dA + \int_{Ar}^{A1} f(A)P(A)dA - \qquad \text{(viii)}$$

$$\left\{ \sigma_r^2 \left( \int_{A2}^{Ar} P(A)dA \right)^2 + 2 \int_{Ar}^{A1} f(A)P(A) \left( \int_{Ar}^{A} P(t)dt \right) dA \right\}$$

$$\therefore \sigma_r^2 - \sigma_o^2 = \sigma_r^2 \int_{A2}^{Ar} P(A)dA \left( 1 - \int_{A2}^{Ar} P(A)da \right) +$$

$$\int_{Ar}^{A1} f(A)P(A) \left\{ 1 - 2 \int_{Ar}^{A1} P(t)dt + \right\} dA$$

Since $\sigma_r^2 > 0$ and $$0 < \int_{Ar}^{A1} P(A)dA < 1,$$

the first term of Eq. (vii) is $$\sigma_r^2 \int_{A2}^{Ar} P(A)dA \left\{ 1 - \int_{A2}^{Ar} P(A)dA \right\} > 0$$

Moreover, in the second term of Eq. (viii), the function $$P(A) \left\{ 1 - 2 \int_{Ar}^{A} P(t)dt \right\}$$

is continuous function in the section Ar, A1, and the function f(A) is the monotone decreasing function in the section Ar, A1, being non-negative. Accordingly, from the theorem of the second mean in integral, A3 (Ar<A-3<A1) satisfying $$f(Ar) \int_{Ar}^{A3} P(A) \left\{ 1 - 2 \int_{Ar}^{A} P(t)dt \right\}$$

exits, and the value of the second term of Eq. (viii) equals to this mean.

$$(\text{Second term}) = f(Ar) \int_{Ar}^{A3} P(A)dA -$$

$$2f(Ar) \int_{Ar}^{A3} P(A) \left\{ \int_{Ar}^{A} (P(t)dt \right\} dA$$

$$= f(Ar) \int_{Ar}^{A3} P(A)dA -$$

$$f(Ar) \int_{Ar}^{A3} P(A)\{P^2(A) - P^2(Ar)\}dA$$

$$= f(Ar) \int_{Ar}^{A3} \{P(A) - P^3(A)\}dA +$$

$$f(Ar) \int_{Ar}^{A3} P(A)P^2(Ar)dA$$

$$(\text{Second term}) = f(Ar) \int_{Ar}^{A3} P(A)\{1 - P^3(A)\}dA +$$

$$f(Ar) \cdot P^2(Ar) \int_{Ar}^{A3} P(A)dA$$

where $0 < p(A) < 1$, and $\int_{Ar}^{A3} P(A)dA > 0$.

$$(\text{second term}) = f(Ar) \int_{Ar}^{A3} P(A)\{1 - P^2(A)\}dA +$$

$$f(Ar) \cdot P^2(Ar) \int_{Ar}^{A3} P(A)dA > 0$$

Accordingly, both the first and the second terms of Eq. (viii) are positive.

$$\frac{\sigma_r^2 - \sigma_o^2}{\sigma_r^2 > \sigma_o^2} > 0$$

Thus, the mean $\overline{\sigma_o^2}$ of the error $\epsilon$ in this embodiment becomes small. Accordingly, the error $\epsilon$ contained in the speed signal v which can be obtained by this embodiment is smaller than that to be obtained by the embodiment of FIG. 1. That is, the speed detection accuracy is enhanced.

Now, the better response of speed detection signifies the longer duration over which the true speed signals are output with respect to the entire detection time, and at any moment the probability of true speed signal output is large. That is, the probability of the amplitude signal corresponding to the speed signal being output larger than the reference signal is large.

In the embodiments shown in FIG. 1 and this embodiment, if the probabilities of the amplitude signal $e_{a1}$ larger than the reference signal $e_r$ are respectively taken as PT and PTS, those probabilities can be expressed as follows.

$$P_T = \int_{Ar}^{A1} P(A)dA \quad \text{(ix)}$$

$$P_{TS} = 2 \int_{Ar}^{A1} P(A) \left\{ \int_{A2}^{A} P(t)dt \right\} dA \quad \text{(x)}$$

Now, if $$P = \int_{A2}^{A} P(t)dt,$$

Eq. (x) can be represented as Eq. (xi).

$$P_{TS} = 2 \int_{Ar}^{A1} PdP \quad \text{(xi)}$$

$$P_{TS} = \left\{ \int_{A2}^{A} P(A)dA \right\}^2 \Big|_{Ar}^{A1}$$

-continued $$= \left\{ \int_{A_2}^{A_1} P(A)dA \right\}^2 - \left\{ \int_{A_2}^{A_r} P(A)dA \right\}^2$$

$$P_{TS} = 1 - \left\{ \int_{A_2}^{A_r} P(A)da \right\}^2 \quad \text{(xii)}$$

From Eq. (ix)

$$PT = 1 - \int_{A_2}^{A_r} P(A)dA$$

Since $$0 < \int_{A_2}^{A_r} P(A)dA < 1, PTS > PT.$$

Accordingly, higher probability of detecting the true speed signal can be obtained by this embodiment than the embodiment shown in FIG. 1. That is, better response can be obtained.

On the other hand, the device having the arithmetic circuit 18′ functions as follows. As already described, the speed signal when the amplitude signal is large represents the truer speed, i.e., the error is small. Accordingly, by causing the arithmetic circuit 18′ to perform the operation of the weighted mean shown in the following Eq. (xiii) taking the amplitude signals $e_{a1}$ and $e_{a2}$ as weight, the speed signal v′ showing the truer speed can be obtained.

$$v' = \frac{e_{a1}v_1 + e_{a2}v_2}{e_{a1} + e_{a2}} \quad \text{(xiii)}$$

That is, the error ε contained in the speed signal v′ obtained by the arithmetic circuit 18′ is smaller than the error contained in the speed signals $v_1$ and $v_2$ output from the devices (Doppler radars) DL1 and DL2.

The probability Pd of the amplitude signals $e_{a1}$ and $e_{a2}$ of the devices DL1 and DL2 concurrently becoming smaller than the reference signal $e_r$ is $$Pd = \left\{ \int_{A_2}^{A_r} P(A)dA \right\}^2$$

while the probability Pc of the amplitude signal $e_a$ becoming smaller than the reference signal $e_r$ in the embodiment shown in FIG. 1 is $$Pc = \int_{A_2}^{A_r} P(A)dA$$

Now, since $0 < \int_{A_2}^{A_r}P(A)dA < 1$, Pc > Pd. Accordingly, the probability of the speed signal v′ containing the true speed signal is large, i.e., the response characteristic is improved.

Figure 8:
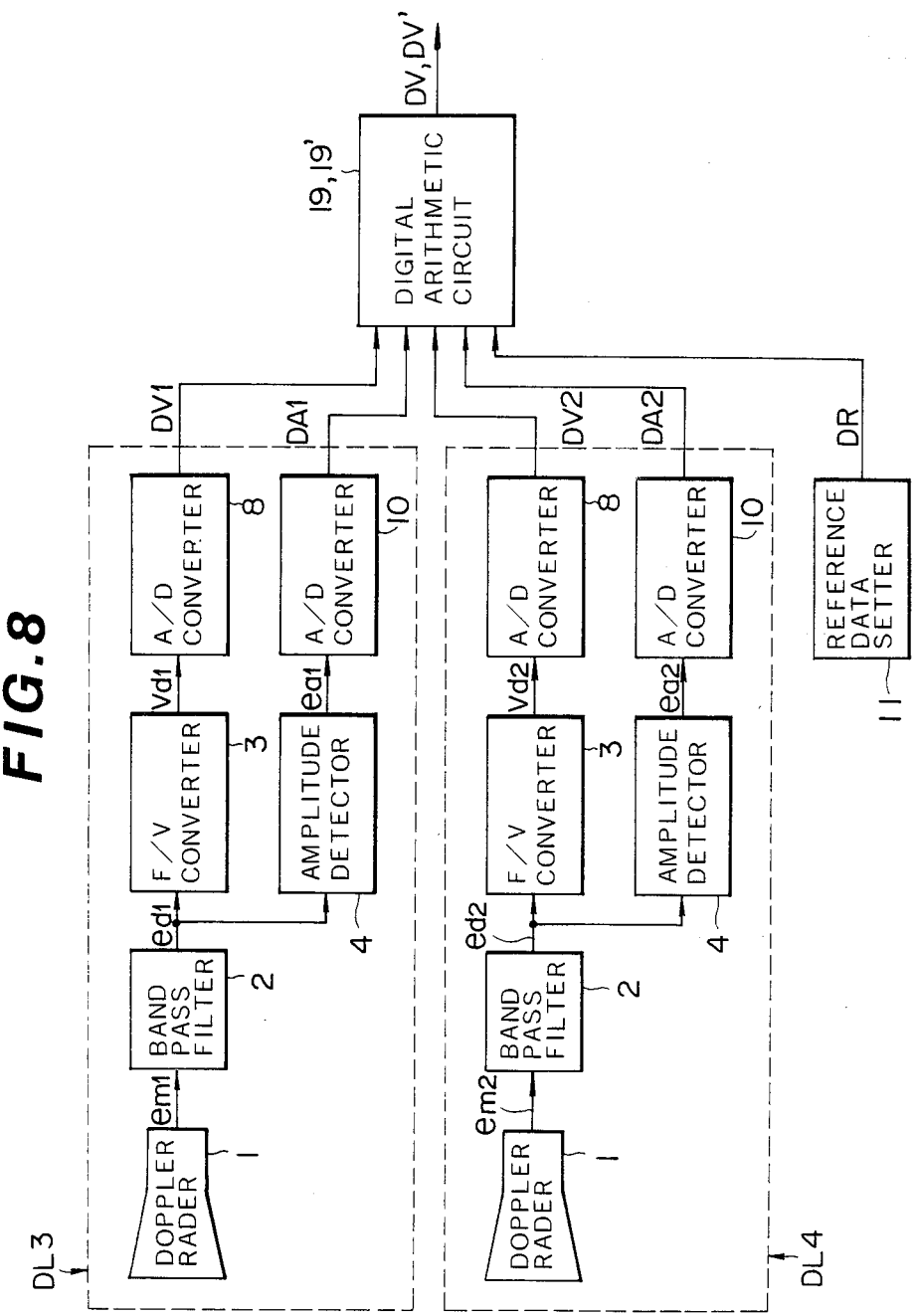
FIG. 8 is a block diagram of still another embodiment of the present invention.

The speed detecting device shown in the embodiment of FIG. 8 uses digital arithmetic circuits 19 and 19′ as the arithmetic circuits 18 and 18′ in the embodiment of FIG. 7, and is arranged so as to convert analog speed signals and amplitude signals of individual Doppler radars to digital signals, and to feed those digital signals to the digital arithmetic circuits 19 and 19′.

In the device shown in FIG. 8, the output analog speed signals vd1 and vd2 of the frequency-voltage converters 3′ are converted to the speed data DV1 and DV2 which are the corresponding digital dignals, through the analog-to-digital converters 8, respectively.

On the other hand, the amplitude signals $e_{a1}$ and $e_{a1}$ are converted to the amplitude data DA1 and DA2 which are the corresponding digital signals, through the analog-to-digital converters 10, respectively.

The reference data setter 11 is for setting a reference data DR which is the basis of the comparison of the amplitude data.

The speed data DV1 and DV2, the amplitude data DA1 and DA2, and the reference data DR are fed to the digital arithmetic circuits 19 and 19′.

The digital arithmetic circuit 19 compares the amplitude data DA1 and DA2 with the reference data DR, and forms speed data DV11 and DV22 (not shown) for operation which correspond to the speed signals v1 and v2 of the embodiment described previously. Then, the circuit 19 compares the amplitude data DA1 and DA2, and outputs the speed data DV11 as the speed data DV if DA1>DA2, while said circuit 19 outputs the speed data DV22 as the speed data DV if DA2>DA1.

On the other hand, the digital arithmetic circuit 19′ compares the amplitude data DA1 and DA2 with the reference data DR, and forms speed data DV′11 and DV′22 (not shown) for operation which correspond to the speed signals v1 and v2 of the aforementioned embodiment. Then, said circuit 19′ performs operation based on the following Eq. (xiv) which corresponds to Eq. (xiii), and generates a speed data DV′.

$$DV' = \frac{DA_1 \times DV_{11} + DA_2 \times DV_{22}}{DA_1 + DA_2} \quad \text{(xiv)}$$

The speed data DV and DV′ obtained at the arithmetic circuits 19′ and 19′ are output to the next stage travel control unit, etc. (not shown).

Though the embodiments shown in FIGS. 7 and 8 employ two devices shown in FIG. 1, using more than two such devices may be feasible, with the resultant further enhanced detection accuracy.

Figure 9:
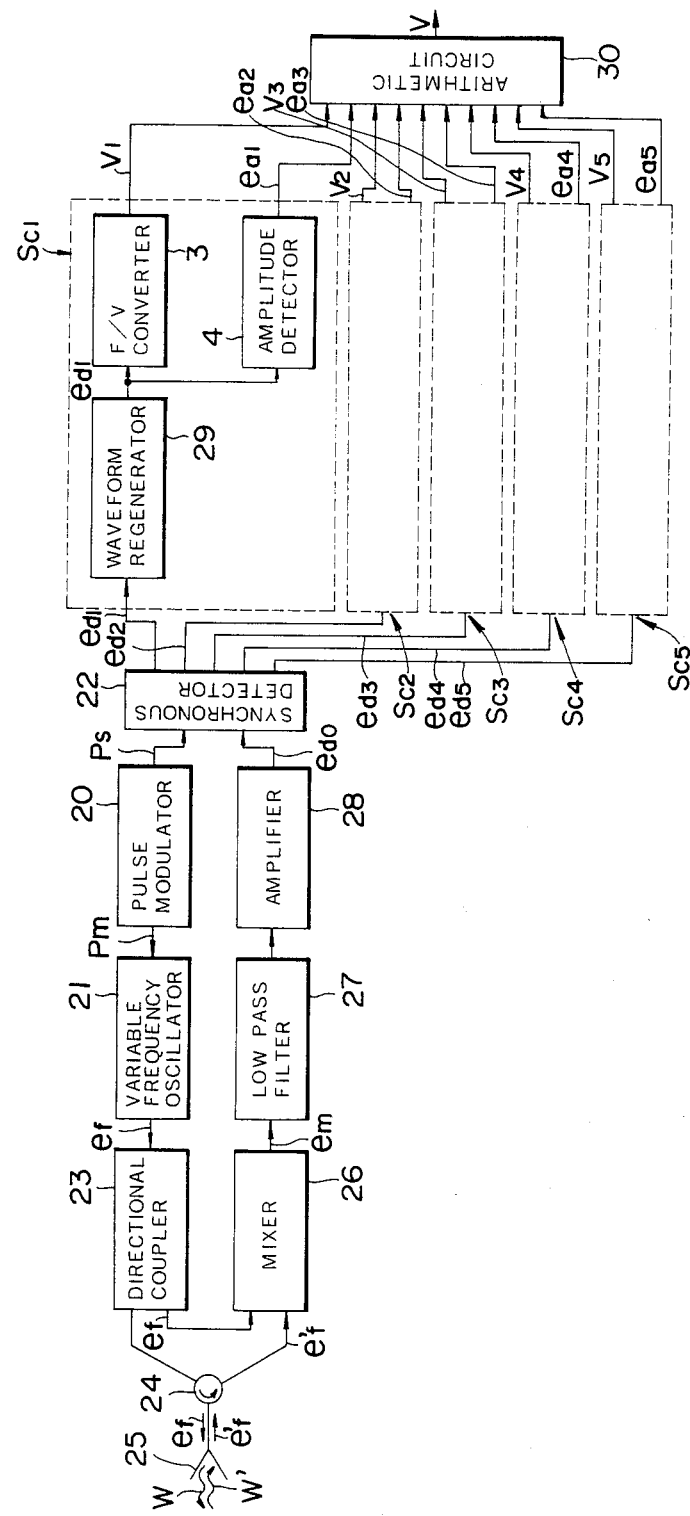
FIG. 9 is a block diagram of still another embodiment of the present invention.

FIG. 9 shows another embodiment of the speed detecting device, and FIGS. 10(a) through 10(c) show waveforms for illustrating the function of the device shown in FIG. 9.

A pulse modulator 20 shown in FIG. 8 generates a control signal Pm which changes the oscillation frequency of a variable frequency oscillator 21 at a specified period T, and also generates a synchronizing signal Ps which is for operating a synchronous detector 22 synchronized with the oscillation frequency change of the variable frequency oscillator 21. This control signal Pm is, for example, a stair step voltage signal of the period T if the variable frequency oscillator 21 is of the voltage control type, and the voltage is set at the number (five in this embodiment) of the oscillation frequency of said oscillator 21.

The variable frequency oscillator 21 generates frequency signals $e_f$ which change in the step-like form from f1 to f5 at the period T as shown in FIG. 10(a) corresponding to the control signal Pm. The frequencies f1–f5 are microwaves (GHz band), and the change width is around several MHz.

This frequency signal ef is fed to an antenna 25 through a directional coupler 23 and a circulator 24, and radar waves W are radiated from the antenna 25. The frequency signal $e_f$ branched at the directional coupler 23 is fed to one input of a mixer 26.

Echo wave W' returned from the target (the object to be measured (not shown)) is received at the antenna 25, and converted to a frequency signal $e_f'$, said frequency signal $e_f'$ being fed to the other input of the mixer 26 via the circulator 24.

The mixer 26 mixes the frequency signals $e_m$ is rid of the harmonic component via a low pass filter 27, and fed to the synchronous detector as a Doppler signal $e_{do}$ via an amplifier 28.

The waveform of the Doppler signal $e_{do}$ is shown in FIG. 10(b). That is, the Doppler signal has a waveform in which the Doppler signal affected by fading when the frequencies of radar waves W f1–f5 are combined frequency by frequency on a time-division basis.

The synchronous detector 22 detects the doppler signal $e_{do}$ synchronized with the synchronizing signal Ps, and forms Doppler signals $e_{d1}$–$e_{d5}$ sequentially corresponding to frequencies f1–f5. Accordingly, the waveform of the Doppler signal $e_{d1}$ becomes as shown in FIG. 10(c), and other Doppler signals $e_{d2}$–$e_{d5}$ become the similar signals.

These Doppler signals $e_{d1}$–$e_{d5}$ are fed to a signal processors Sc1–Sc5 respectively, said processor being composed of a waveform regenerator 29, the frequency-voltage converter 3, and the amplitude detector 4.

The waveform regenerator 29 of the signal processor Sc1 reproduces a signal $e_{d1}'$ of the waveform as shown by a broken line in FIG. 10(c) from the applied Doppler signal $e_{d1}$. This signal $e_{d1}'$ becomes identical with the Doppler signal when the oscillation frequency of the variable frequency oscillator 2 is locked to f1. The signal $e_{d1}'$ is fed to the frequency-voltage converter 3 and the amplitude detector 4.

The frequency-voltage converter 3 of the signal processor Sc1 forms a speed signal v1 which is a voltage signal corresponding to the frequency (Doppler frequency) of the applied signal $e_{d1}'$.

The amplitude detector 4 of the signal processor Sc1 forms an amplitude signal $e_{a1}$ corresponding to the amplitude component of applied signal $e_{d1}'$.

Similarly, other signal processors Sc2–Sc5 form the speed signals v2–v5 and the amplitude signals $e_{a2}$–$e_{a5}$ from the Doppler signals $e_{d2}$–$e_{d5}$ respectively.

The speed signals v1–v5 and the amplitude signals $e_{a1}$–$e_{a5}$ are fed to the arithmetic circuit 30.

The arithmetic circuit 30 detects the largest amplitude signal comparing the amplitude signals $e_{a1}$–$e_{a5}$, and outputs the speed signal corresponding to said largest amplitude signal to the next stage travel control unit, etc. (not shown) as a speed signal v.

As described above, according to this embodiment, a plurality of Doppler signals are obtained by a single Doppler radar, and a speed signal is detected from the Doppler signal of least error, with the resultant improvement of speed detection accuracy. In addition, the device of this embodiment can be made simply at low cost compared with that shown in FIG. 8.

Figure 10:
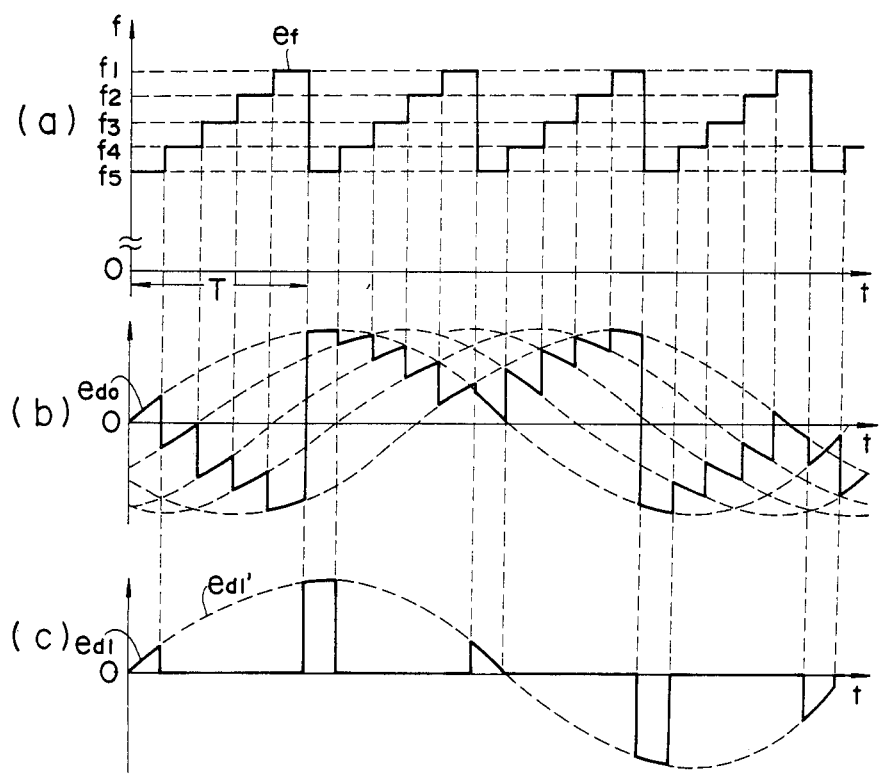
FIG. 10 ($a$) through ($c$) are waveform diagrams for the description of key parts of the device shown in FIG. 8.
Figure 11:
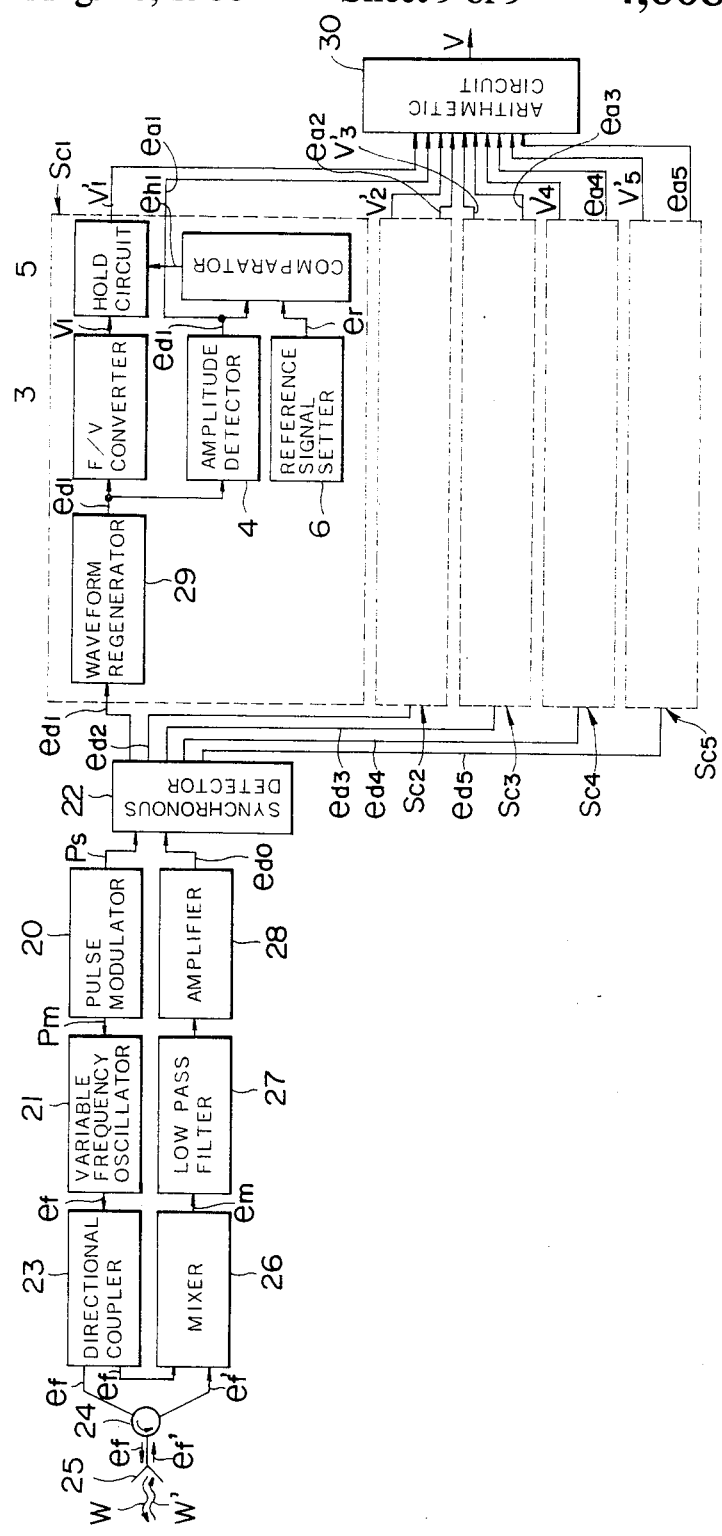
FIG. 11 is a block diagram of still another speed detection device of the present invention.

FIG. 11 shows still another embodiment of the present invention in which the hold circuit 5, the reference setter 6, and the comparator 7 are added to the signal processors Sc1–Sc5 of the device shown in FIG. 10.

The device of this embodiment is arranged so that the output reference voltage $e_r$ of the reference signal setter 6 and the amplitude signal $e_{a1}$ are fed to the comparator 7, and the hold signal $e_{h1}$ which is output from the comparator 7 when $e_r > e_{a1}$ is fed to the hold circuit 5. When no hold signal is fed to the hold circuit 5, the speed signal v1 is caused to be output directly from said circuit as a speed signal v1', the speed signal v1 fed at the rise of the signal $e_{h1}$ is caused to be held at the hold circuit 5 when the hold signal $e_{h1}$ is fed, and said signal v1 is caused to be output as a speed signal v1'. The hold operation of the hold circuit 5 is released at the fall of the hold signal. $e_{h1}$.

The signal processors Sc2'–Sc5' are arranged similar to the signal processor Sc1', and speed signals v2'–v5' are formed and output through the similar function.

These speed signals v1'v5' and amplitude signals $e_{a1}$–$e_{a5}$ are fed to the arithmetic circuit 30, and the arithmetic circuit 30 forms and outputs the speed signal v through the same function as described previously.

The device of the embodiment shown in FIG. 11 has the advantages of the devices shown in FIGS. 1 and 7, and is capable of performing the speed detection at a still higher level of accuracy than the device shown in FIG. 10.

What is claimed is:

1. A speed detecting device having converting means for converting a Doppler signal obtained from a Doppler radar into a corresponding speed indicating signal, comprising:
    reference signal setting means for setting a reference amplitude value;
    amplitude detecting means for detecting the amplitude of said Doppler signal;
    comparing means for comparing said reference amplitude value with the detected amplitude of said Doppler signal in order to identify as a comparison result those portions of said Doppler signal which are detected to be smaller in amplitude than said reference amplitude value; and
    excluding means for excluding from said speed indicating signal corresponding to said Doppler signal those portions of said Doppler signal which are identified as said comparison result; and
    wherein said setting means includes means for setting said reference amplitude value based on the relationship between a amplitude of the Doppler signal and the variance of a speed detection error.

2. The speed detecting device as defined in claim 1, wherein said excluding means includes means for outputting the speed indicating signal which is present immediately before the amplitude of said Doppler signal falls below said reference amplitude value when the amplitude of said Doppler signal is below said reference amplitude value.

3. The speed detecting device as defined in claim 1 wherein said converting means for converting said Doppler signal to said speed indicating signal is a frequency-to-voltage converter.

4. A speed detecting device having converting means for converting a Doppler signal obtained from a Doppler radar into a corresponding speed indicating signal comprising:
    reference signal setting means for setting a reference amplitude value;
    amplitude detecting means for detecting the amplitude of said Doppler signal; and arithmetic operation means for outputting a modified speed indicating signal $V_i^*$ at time i in accordance with the following equation:

$$V_i^* = V_{(i-1)}^* + \frac{A_i}{A_o}[V_i - V_{(i-1)}^*]$$

where:

$A_o$ is equal to said reference amplitude value,
$A_i$ is equal to said amplitude of said Doppler signal at time i,
$V_i$ is equal to said speed indicating signal at time i, and
$V^*_{(i-1)}$ is equal to said modified speed indicating signal at an earlier time $i-1$;

wherein said reference signal setting means includes means for setting said reference amplitude value $A_o$ in accordance with the following equation:

$$A_o = \frac{1}{n} \sum_{j=i-n}^{i} Aj.$$

5. A speed detecting signal comprising:
a plurality of Doppler radars for generating a corresponding plurality of Doppler signals;
amplitude detecting means for detecting and comparing the amplitude of each one of said plurality of Doppler signals to the amplitude of other ones of said plurality of Doppler signals;
selection means for selecting and outputting the Doppler signal having the largest amplitude found as a result of said comparison of the amplitude values detected and compared by said amplitude detecting means;
reference signal setting means for setting a reference amplitude value for each of said Doppler signals;
comparing means for comparing each of said Doppler signals with a corresponding one of said reference amplitude values in order to identify as a comparison result those portions of said detected Doppler signals which are in amplitude smaller than said reference amplitude value;
converting means for converting each of said Doppler signals into a corresponding speed indicating signal; and
excluding means for excluding from each of said Doppler signals converted by said converting means into a corresponding speed indicating signal those portions of said Doppler signals which are identified as said comparison result;
wherein said setting means includes means for setting each of said reference amplitude values based on a relationship between the corresponding amplitude value of each of said Doppler signals and a variance of the speed detection error.

6. The speed detecting device as defined in claim 5, wherein said excluding means includes means for outputting the speed indicating signal which is present immediately before the amplitude of said corresponding Doppler signal falls below said reference amplitude value upon such times as the amplitude of said Doppler signal is below said reference amplitude value.

7. A speed detecting means comprising:
a plurality of Doppler radars for generating a corresponding plurality of Doppler signals;
amplitude detecting means for detecting the amplitudes of said Doppler signals obtained from said plurality of Doppler radars;
converting means for converting each of said Doppler signals into a corresponding speed indicating signal; and
arithmetic computational means for obtaining the weighted arithmetic mean of said speed indicating signals corresponding to said Doppler signals using the amplitude value detected by said amplitude detecting means as the weighting factor;
reference signal setting means for setting a reference amplitude value for each of said Doppler signals;
comparing means for comparing each of said Doppler signals detected amplitudes with said corresponding reference amplitude values in order to identify as a comparison result those portions of said detected Doppler signals amplitudes which are smaller than said reference amplitude value; and
excluding means for excluding from said speed indicating signals corresponding to said Doppler signals those portions of said Doppler signals which are identified as said comparison result;
wherein said setting means includes means for setting said reference amplitude value based on a relationship between the amplitude value of the Doppler signal and a variance of speed detection error.

8. The speed detecting device as defined in claim 7 wherein said excluding means includes means for outputting the speed indicating signal which is present immediately before the amplitude of said Doppler signal falls below said reference amplitude value upon such times as the amplitude of said Doppler signal is below said reference amplitude value.

9. The speed detecting device as defined in claim 7 wherein said converting means for converting said Doppler signal to said speed indicating signal is a frequency-to-voltage converter.

10. A speed detecting device having converting means for converting a Doppler signal obtained from a Doppler radar into a corresponding speed indicating signal, comprising:
a variable frequency oscillator for generating a variable frequency signal;
a modulation generator for changing the oscillation frequency of said variable frequency oscillator in a periodic sequence;
detecting means for detecting said Doppler signal in synchronization with the modulation period of said modulation generator;
signal processing means for forming from said Doppler signal a plurality of modified Doppler signals corresponding to said plurality of frequencies based on the output signal of said detecting means, and for forming from said Doppler signal a plurality of amplitude signals corresponding to said plurality of frequencies;
arithmetic computational means for selecting as an output signal the modified Doppler signal corresponding to that amplitude signal having the largest amplitude of all amplitude signals formed by said signal processing means;
reference signal setting means for presetting a reference amplitude value for each of said plurality of modified Doppler signals obtained by said signal processing means;
comparing means for comparing each of said modified Doppler signals with said corresponding reference amplitude values in order to identify as a comparison result those portions of said modified Doppler signals which are in amplitude smaller than a corresponding said reference amplitude value;

converting means for converting each of said modified Doppler signals to a corresponding speed indicating signal; and excluding means for excluding from each said modified Doppler signals converted by said converting means into said speed indicating signals those portions of said modified Doppler signals which are identified as said comparison result;

wherein said setting means include means for setting said reference amplitude value based on a relationship between the amplitude value of said Doppler signal and a variance of the speed detection error.

11. The speed detecting device as defined in claim 10, wherein said excluding means includes means for outputting the speed indicating signal which is present immediately before the amplitude of said Doppler signal falls below said reference amplitude value upon such times as the amplitude of said Doppler signal is below said reference amplitude value.

12. The speed detecting device as defined in claim 10 wherein said converting means for converting said Doppler signal to said speed indicating signal is a frequency-to-voltage converter.

* * * * *